Sept. 25, 1973        C. E. STROM ET AL        3,761,256
         FRICTION ARTICLES AND PROCESSES FOR MANUFACTURING
                         AND MOUNTING SAME
Filed June 1, 1971                              2 Sheets-Sheet 1

INVENTORS
CHARLES E. STROM
& LEO J. LeBLANC JR.
BY
ATTORNEY

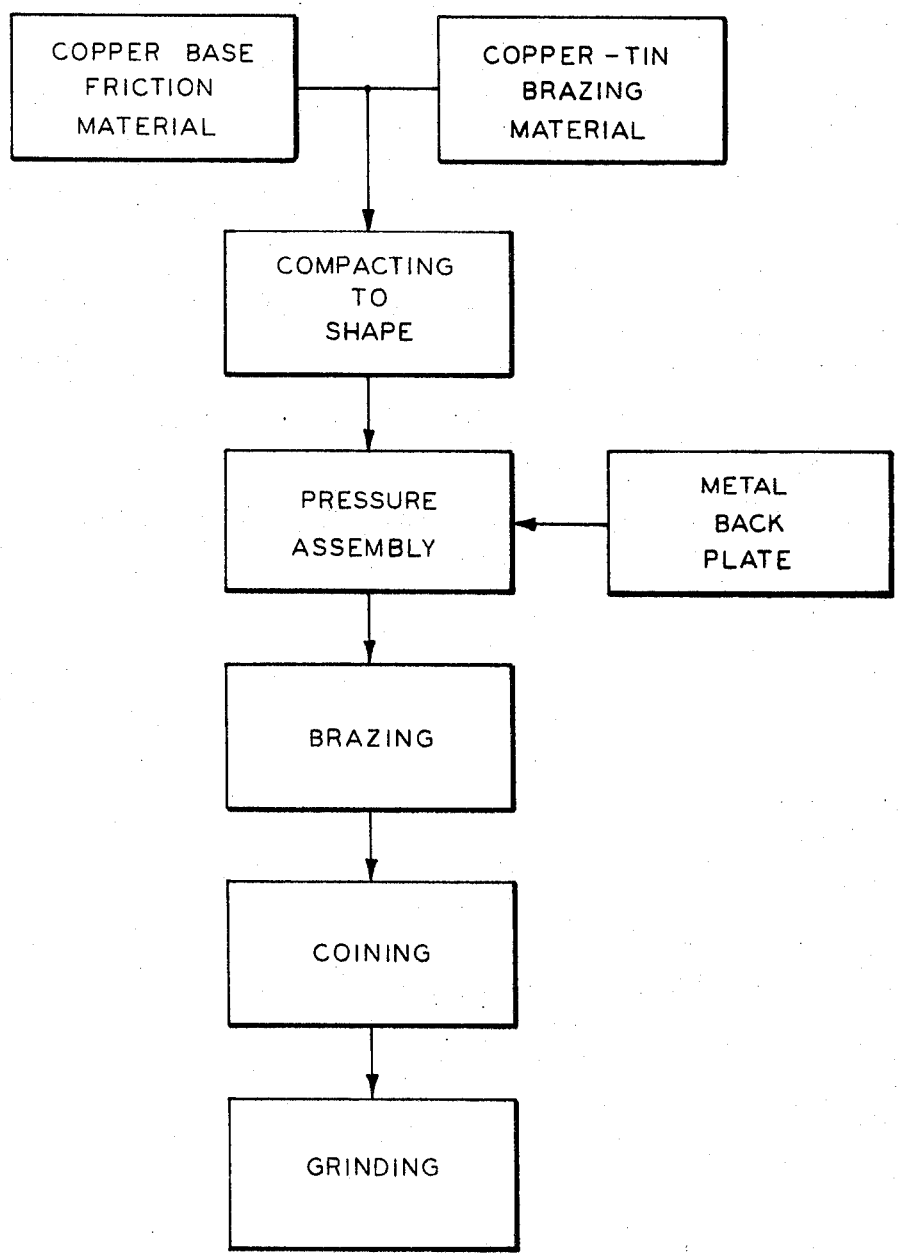

United States Patent Office 3,761,256
Patented Sept. 25, 1973

3,761,256
FRICTION ARTICLES AND PROCESSES FOR MANUFACTURING AND MOUNTING SAME
Charles E. Strom, Troy, and Leo J. Le Blanc, Jr., Waterford, N.Y., assignors to The Bendix Corporation
Filed June 1, 1971, Ser. No. 148,667
Int. Cl. B22f 5/00, 7/04
U.S. Cl. 75—208 R                                    1 Claim

ABSTRACT OF THE DISCLOSURE

A brake or clutch friction composition comprised of a copper base friction material metallurgically bonded to a steel backing plate.

BACKGROUND OF THE INVENTION

This invention relates to the art of friction compositions for use in clutch and brake devices, or the like. The invention is particularly useful in metallurgically bonding a copper base friction material to a copper clad or copper plated metal plate to form a friction article useful in brakes and clutches.

Both the article and the process disclosed herein are useful in a wide variety of brakes, including the drum type brake employing an arcuate shoe; the disc type brake in which there are relatively rotatable and nonrotatable annular members; and the so-called "caliper" brake in which the friction segments engage with a portion only on the rotor. The friction articles and manufacturing processes are also useful in clutch devices (both wet and dry processes).

Friction materials which can be used in conjunction with the present invention are described in considerable detail in U.S. Pats. 2,784,105 to F. E. Stedman et al. and 3,037,860 to J. F. Masterson et al.

Generally, a ceramic-metallic friction article includes a reinforcing cup having a base with a surrounding laterally extending side which provides reinforcement for the friction material and mechanically locks the friction material within the cup. Some combinations include a steel screen welded to the reinforcing cup to assist in mechanically bonding the ceramic-metallic friction material to the cup. These features are shown in co-pending application Ser. No. 148,666 filed June 1, 1971.

The reinforcing cup has two distinct functions: (1) the friction material is given lateral support by the side of the cup to compensate for the friable tendency of the material, i.e., the wall of the cup reinforces the friction material against crumbling under tangential and normal loading; (2) the cup serves to mechanically lock the friction material by serving as a container. The container or cup is then in turn secured to the mounting member since the friction material is not readily attachable directly thereto owing to its relatively weak character.

Up to the present time, friction articles made by known processes and attached to clutch plates have not been able to withstand spinning clutch speeds of excessive r.p.m. and associated centrifugal force without bursting, i.e., separating from the backing plate or partial separation of the friction material from the backing plate which is attached to the clutch.

SUMMARY OF THE INVENTION

This invention provides a friction material article that has high burst strengths (on separation of the friction material from the backing plate at speeds of 10,000 r.p.m. and more than 5,000 lbs. centrifugal force) when used in clutch applications.

The invention is a friction article and a process for making the same and is characterized by a copper based friction material metallurgically bonded to a metal backing plate. In one embodiment of the friction member, the friction member consists essentially of a copper clad steel backing plate, and a copper based friction material having at least one surface consisting essentially of 5 to 30% by weight tin and 70 to 95% by weight copper metallurgically bonded to said backing plate. One method of making the copper base friction article comprises the steps of: placing a layer of powdered copper base friction material on top of a layer of powdered brazing material consisting essentially of 5 to 30% by weight tin and 70 to 95% by weight copper; compacting the combined material to obtain a solid mass having the brazing material on one side thereof; placing the formed article against a copper clad steel plate so that said brazing material contacts said copper cladding of said steel plate; holding the formed article and steel plate in pressure contact; and heating the formed article and steel plate to brazing temperature to cause bonding of the copper base friction material to the steel plate. Burst tests of the preceding friction member in clutch applications indicate that the friction material will not separate from the backing plate until speeds in excess of 10,500 r.p.m. are exceeded when testing on 15 inch diameter clutch discs, which subject the friction article to centrifugal force in excess of 5,000 lbs.

Accordingly, it is an object of this invention to provide a method whereby the copper base friction material may be directly bonded to a carrier plate without a perforated disc or screen and without the necessity of riveting, welding or fastening by means other than a metallurgical bond.

It is another object of this invention to provide a friction article for brake and clutch applications that has a high burst strength.

It is a further object of this invention to increase the reliability and, therefore, safety of clutches used at high speed.

The above and other objects and features of the invention will become apparent from the following detailed description taken in conjunction with the accompanying drawings and claim which form a part of this specification.

BRIEF DESCRIPTION OF THE DRAWINGS

FIG. 4 is a flow diagram of a preferred process for making a friction member.

DETAILED DESCRIPTION OF THE DRAWINGS

Figure 1:
FIG. 1 is a cross-sectional view of a friction member made in accordance with the principles of this invention.

Referring now to the drawings, FIG. 1 illustrates a cross-sectional view of the friction article made in accordance with the principles of this invention. The metallic reinforcing cup 1 contains the friction material 3 which is metallurgically bonded to the reinforcing cup. The reinforcing cup 1 can be a reinforcing plate of steel or similar metal and in one preferred embodiment is a steel plate with a copper cladding which faces the friction material 3. The lower portion of the friction material 3 which is in contact with the plate 1 consists essentially of 5 to 30% by weight tin and 70 to 95% by weight copper. The remainder of the friction material is a copper base friction material.

Figure 2:
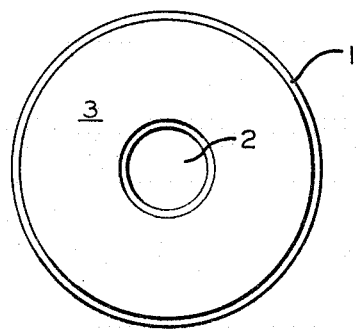
FIG. 2 is a top view of the friction article shown in FIG. 1.

FIG. 2 is a top view of the friction article shown in FIG. 1. The hole 2 located through the friction material 3 and the reinforcing plate 1 is used to mount a friction article on a clutch plate (not shown).

Figure 3:
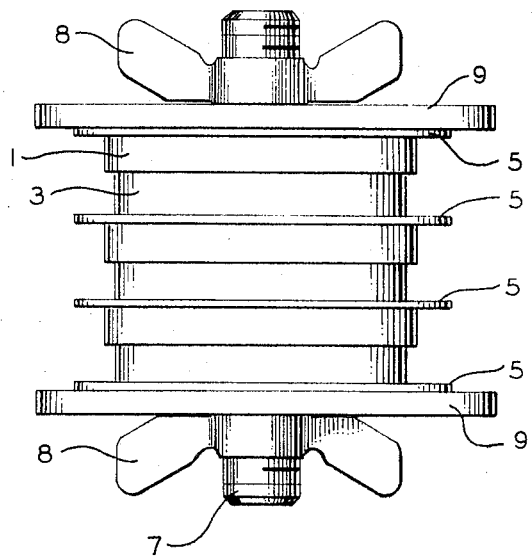
FIG. 3 illustrates how the friction article is assembled before being brazed.

FIG. 3 illustrates the friction articles assembled on a spindle 7 before being placed into a furnace for heating.

The spindle 7 includes two wing nuts 8 for tightening down on plate 9 to secure the friction material 3 in pressure contact with the reinforcing cup 1. The components are arranged on the spindle 7 in the following manner: First a metal plate 9 is placed on the spindle against one of the wing nuts 8. Then, a reinforcing plate or cup 1 is placed against the metal plate with the open end facing away from the plate 9. Next, a formed friction material article is placed on the spindle 7. The surface of the friction material having the brazing material of copper and tin faces and contacts the reinforcing plate 1 which is already on the spindle 7. Next, a spacer 5 is placed on the spindle 7 to separate the friction material from the next reinforcing cup 1 which is placed on the spindle 7. As many components as practical may be assembled on the spindle 7. When the last piece of friction material is placed on the spindle, an end plate 9 is placed on the spindle and then a wing nut 8 is tightened down against the end plates 9. The stacked group placed between the end plates are spindled together by finger nuts 8 which are drawn finger tight (about 70 inch pounds torque) and the assembly is then brazed by known techniques.

FIG. 4 illustrates a flow chart of the process utilized to obtain the friction articles of this invention. The process comprises the placing of a copper tin brazing material consisting essentially of 5 to 30% by weight tin and 70–95% by weight copper in a mold. The copper tin brazing material should have a loose uniform fill depth of at least .001 of an inch and preferably in the range of .002 inch to .025 inch in thickness. A copper base friction material generally of copper with additions of tin, graphite, mullite and oil is then deposited upon this brazing material and, pressure formed to a solid mass which is called a preform. The preform is then removed from the mold and placed in the reinforcing cup or steel backing plate in a manner wherein the brazing material in the preform is in contact with the metal reinforcing plate. The reinforcing plate is preferably steel with a copper clad surface that is in contact with the brazing material. The preform and the metal backing plate are then assembled on a spindle and held together in pressure contact. A preferred assembly is shown in FIG. 3. The purpose of this type assembly is to hold the copper brace friction material is pressure contact with the reinforcing plate so that during sintering a metallurgical bond between the two will be accomplished. Once the friction article is assembled on the spindle, it is placed in a furnace where it is heated to a temperature below its melting point, generally in the range of 1350 to 1650° F. for a period of about 20 to 90 minutes depending on the temperature chosen. At sintering temperatures or brazing temperatures, as is the case, the copper base friction material with the assistance of the brazing alloy formed in the sintering process is metallurgically bonded to the backing plate. The assembly is then removed from the oven or furnace and cooled. The friction article is then coined and ground to a preferred shape and thickness.

A friction article, made in accordance with the above method, was attached to a clutch plate and rotated at high speeds to test the strength of the bond between the friction material and the backing plate. It was determined that the friction material was able to withstand a centrifugal force of at least 5,000 lbs. This was determined by mounting a friction article on a 15 inch clutch plate and rotating the clutch plate at speeds of 11,300 r.p.m. and greater.

While a preferred embodiment of the invention has been disclosed, it will be apparent to those skilled in the art that changes may be made to the invention as set forth in the appended claim, and, in some cases, certain features of the invention may be used to advantage without corresponding use of other features. For example, the shape of the backing plate and the friction article may take various forms and, in fact, the reinforcing plate for the friction material may be the clutch plate itself. Accordingly, it is intended that the illustrative and descriptive materials herein be used to illustrate the principles of the invention and not to limit the scope thereof.

Having described the invention, what is claimed is:

1. A method of metallurgically bonding a copper base friction material to a copper clad steel plate to form a friction article, comprising the steps of:

placing a layer of powdered brazing material consisting of from 5 to 30% by weight of tin and 70 to 95% by weight of copper in a mold to a uniform depth of between .002 to .025 inch;

depositing a layer of said copper base friction material on top of said brazing material to form a layered composite;

compacting the layered composite into a solid mass having the brazing material located exclusively on one side thereof;

removing the solid mass from the mold;

bringing said brazing material of the solid mass into contact with said copper clad steel plate;

holding the brazing material against the copper clad steel plate with a pressure force of about 70 lbs./in.$^2$;

heating the held solid mass and copper clad steel plate in an oven having a temperature from 1650° F. to 1350° F. for a corresponding period of from 20 to 90 minutes causing the brazing material to sinter and alloy the copper base friction material to the copper clad steel plate and form a friction member;

cooling said friction member;

applying a compressive force to densify the friction member by coining; and grinding the coined friction member to a preferred shape and thickness to meet existing requirements of said friction article.

References Cited
UNITED STATES PATENTS

| | | | |
|---|---|---|---|
| 3,087,814 | 4/1963 | Smiley | 75—208 |
| 2,191,460 | 2/1940 | Fisher | 75—208 |
| 2,251,410 | 8/1941 | Koehring et al. | 75—208 |
| 2,646,151 | 7/1953 | Wellman et al. | 75—208 |
| 2,161,597 | 6/1939 | Swartz | 75—208 |

CARL D. QUARFORTH, Primary Examiner

B. HUNT, Assistant Examiner

U.S. Cl. X.R.

29—182.2, 182.3; 75—226, 200